(12) United States Patent
Maruyama et al.

(10) Patent No.: US 9,303,174 B2
(45) Date of Patent: *Apr. 5, 2016

(54) BLACK INK COMPOSITION

(71) Applicant: Seiko Epson Corporation, Tokyo (JP)

(72) Inventors: Chie Maruyama, Matsumoto (JP); Minharu Kanaya, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,607

(22) Filed: Dec. 15, 2014

(65) Prior Publication Data

US 2015/0097893 A1    Apr. 9, 2015

Related U.S. Application Data

(63) Continuation of application No. 13/038,599, filed on Mar. 2, 2011, now Pat. No. 8,960,877.

(30) Foreign Application Priority Data

Mar. 2, 2010  (JP) .................. 2010-045703
Mar. 2, 2010  (JP) .................. 2010-045715

(51) Int. Cl.
*B41J 2/01*     (2006.01)
*C09D 11/324*   (2014.01)
*B41J 2/21*     (2006.01)
*B41J 2/015*    (2006.01)
*C09D 11/02*    (2014.01)
*C09D 133/02*   (2006.01)
*C08K 5/053*    (2006.01)
*C09D 11/36*    (2014.01)
*C09D 125/14*   (2006.01)

(52) U.S. Cl.
CPC ............. *C09D 11/324* (2013.01); *B41J 2/015* (2013.01); *B41J 2/2107* (2013.01); *C08K 5/053* (2013.01); *C09D 11/02* (2013.01); *C09D 11/36* (2013.01); *C09D 125/14* (2013.01); *C09D 133/02* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......... 347/100, 95, 96, 101, 88, 99, 21, 20, 9; 106/31.6, 31.27, 31.13; 523/160, 161
See application file for complete search history.

(56) References Cited

U.S. PATENT DOCUMENTS

| | | | |
|---|---|---|---|
| 5,609,671 A | 3/1997 | Nagasawa | |
| 6,123,759 A | 9/2000 | Mise et al. | |
| 6,740,152 B1 | 5/2004 | Fukuda | |
| 2002/0014184 A1 | 2/2002 | Yeh et al. | |
| 2005/0120914 A1 | 6/2005 | Momose et al. | |
| 2005/0155060 A1 | 7/2005 | Sato et al. | |
| 2006/0052473 A1 | 3/2006 | Takabayashi | |
| 2007/0106962 A1* | 5/2007 | Sakakibara et al. | 347/100 |
| 2008/0022887 A1 | 1/2008 | Tanoue et al. | |
| 2009/0165674 A1* | 7/2009 | Tonishi | 106/31.65 |
| 2009/0258146 A1 | 10/2009 | Saito et al. | |
| 2009/0258147 A1 | 10/2009 | Saito et al. | |

FOREIGN PATENT DOCUMENTS

| | | |
|---|---|---|
| JP | 08-003498 A | 1/1996 |
| JP | 10-237349 A | 9/1998 |
| JP | 2001-081366 A | 3/2001 |
| JP | 2002-080761 A | 3/2002 |
| JP | 2005-179506 | 7/2005 |
| JP | 2006-104452 A | 4/2006 |
| JP | 2009-203333 A | 9/2009 |
| JP | 2009-256605 A | 11/2009 |
| JP | 2009-256606 A | 11/2009 |
| WO | 01/94476 A2 | 12/2001 |
| WO | 2004/061015 A1 | 7/2004 |

* cited by examiner

*Primary Examiner* — Manish S Shah
(74) *Attorney, Agent, or Firm* — Nutter McClennen & Fish LLP; John J. Penny, Jr.

(57) ABSTRACT

Provided is a black ink composition containing a pigment, wherein the value calculated from the average particle diameter and the particle size distribution width of the pigment and the ink viscosity is regulated within a certain range, and the number of coarse particles contained in the ink composition is regulated to a certain value or less. The ink composition is excellent in ink storage stability and can give an image realized with good balance between color development, in particular, in high-speed printing and inhibition of a time-dependent change in printing density due to pigment sedimentation.

12 Claims, No Drawings

BLACK INK COMPOSITION

CROSS REFERENCE TO RELATED APPLICATIONS

This application is a continuation of U.S. patent application Ser. No. 13/038,599, filed on Mar. 2, 2011, and claims priority to Japanese Patent Application Nos. JP 2010-045703 filed on Mar. 2, 2010, and JP 2010-045715 filed on Mar. 2, 2010, all of which are hereby incorporated by reference in their entirety.

BACKGROUND

1. Technical Field

The present invention relates to a black ink composition containing a pigment.

2. Related Art

An ink jet recording method is a printing process for conducting printing by letting ink droplets fly and adhere to a recording medium such as paper. Inks used in the method are usually prepared by dissolving various kinds of water-soluble dyes in water or in mixtures of water and water-soluble organic solvents. It is pointed out that images formed with such inks containing water-soluble dyes are usually inferior in water resistance and light resistance.

On the other hand, inks prepared by dispersing pigments in aqueous solvents are superior in water resistance and light resistance. For example, aqueous pigment inks in which pigments are dispersed with surfactants or polymer dispersants have been proposed. However, in some these inks, an increase in colorant content for increasing the printing density of a recorded matter causes a drastic increase in ink viscosity.

In order to solve this problem, proposed is a dispersion of a self-dispersing pigment, which can be dispersed in an aqueous solvent by itself without requiring any use of dispersant such as a surfactant or a polymer dispersant, due to surface-active hydrogen or its salt introduced to the pigment surface in a certain amount or more.

In JP-A-10-237349, JP-A-8-3498, and WO01/94476, it is described that the so-called self-dispersing pigment, which is dispersible in the absence of dispersants as described above, has characteristics, for example, that it increases the optical density (OD) value of an image when used as a colorant in an ink.

Furthermore, as an ink set having an excellent color-developing property, JP-A-2009-256605 discloses an ink set including a black ink composition containing a self-dispersing pigment having a hydrophilic group on its surface.

However, images formed by these inks containing the self-dispersing pigments as colorants are usually inferior in fixing property and may get dirty when they are rubbed with, for example, a finger, a line marker, or paper. Thus, recorded matters of these images may have insufficient abrasion resistance. Accordingly, in order to improve the fixing properties of self-dispersing pigments to recording media, an ink composition containing a resin that shows adhesion to recording media has been proposed.

JP-A-2001-81366 and JP-A-2002-80761 propose, for example, a recording solution including a colorant, resin particles, and water; and a recording solution for ink printers including resin particles and an aqueous dispersion of a pigment, as ink compositions containing resin particles.

Furthermore, JP-A-2009-256606 discloses an ink set including a black ink composition that contains a self-dispersing pigment having a hydrophilic group on its surface and a color ink composition that contains a self-dispersing pigment having a hydrophilic group on its surface via a phenyl group. Each ink composition contains a resin emulsion.

Nevertheless, there is still a demand for an ink composition that can realize an image in which both enhancement of a color-developing property and satisfactory inhibition of a time-dependent change in printing density due to pigment sedimentation are achieved.

JP-A-2006-104452 discloses an actinic ray-curable ink-jet ink containing particles having an average diameter of 0.08 to 0.25 μm in which the number of coarse particles having a particle size not smaller than 1 μm is less than $6.0 \times 10^5/\mu L$.

SUMMARY

The inventors have recently found the fact that a black ink composition containing a pigment can have satisfactory ink storage stability and can give an image realized with good balance between color development on plain paper, in particular, in high-speed printing and inhibition of a time-dependent change in printing density due to pigment sedimentation by regulating the value calculated from the average particle diameter, the particle size distribution width, and the ink viscosity of the pigment contained in the ink composition within a certain range and regulating the number of coarse particles contained in the ink composition to a certain value or less. The black ink composition absolutely differs from the above-mentioned actinic ray-curable ink jet ink.

Furthermore, the inventors have found the fact that a black ink composition containing a pigment can have satisfactory ink storage stability and can give an image realized with good balance between color development on plain paper, in particular, in high-speed printing and inhibition of a time-dependent change in printing density due to pigment sedimentation and having an improved fixing property to, in particular, plain paper by regulating the value calculated from the average particle diameter, the particle size distribution width, and the ink viscosity of the pigment contained in the ink composition within a certain range, regulating the number of coarse particles contained in the ink composition to a certain value or less, and adding a resin emulsion to the ion composition. The invention has been accomplished based on these findings.

An advantage of some aspects of the invention is to provide an ink composition that has satisfactory ink storage stability and can give an image realized with good balance between color development on plain paper, in particular, in high-speed printing and inhibition of a time-dependent change in printing density due to pigment sedimentation. Furthermore, in addition to the advantage, an advantage of some aspects of the invention is to provide an ink composition that can realize an image having an improved fixing property to, in particular, plain paper.

The composition according to an aspect of the invention is a black ink composition containing a pigment, wherein the value, X, calculated, from the average particle diameter (nm), D50%, of the pigment contained in the ink composition, the particle size distribution width (nm), D90%–D10%, of the pigment contained in the ink composition, and the ink viscosity (mPa·s), η, at 20° C., by the following Expression (I):

$$X = \{D50\% \times (D90\% - D10\%)\}/\eta \quad (I)$$

is within a range of 2500 to 4500, and the number of coarse particles having a pigment particle size not smaller than 0.5 μm contained in the ink composition is $7.0 \times 10^9$ or less per 1 mL of the ink composition.

The composition according to an aspect of the invention is a black ink composition containing a pigment and a resin emulsion, wherein the value, X, calculated, from the average particle diameter (nm), D50%, of the pigment contained in the ink composition, the particle size distribution width (nm), D90%–D10%, of the pigment contained in the ink composition, and the ink viscosity (mPa·s), η, at 20° C., by the following Expression (I):

$$X=\{D50\% \times (D90\%-D10\%)\}/\eta \quad (I)$$

is within a range of 2500 to 4500, and the number of coarse particles having a pigment particle size not smaller than 0.5 μm contained in the ink composition is $7.0 \times 10^9$ or less per 1 mL of the ink composition.

According to an aspect of the invention, an ink composition that has satisfactory ink storage stability and can give an image realized with good balance between color development on plain paper, in particular, in high-speed printing and inhibition of a time-dependent change in printing density due to pigment sedimentation can be provided. Furthermore, an ink composition that can realize an image having an improved fixing property to, in particular, plain paper can be provided.

DESCRIPTION OF EXEMPLARY EMBODIMENTS

The ink composition according to an aspect of the invention is a black ink composition containing a pigment, wherein the value, X, calculated, from the average particle diameter (nm), D50%, of the pigment contained in the ink composition, the particle size distribution width (nm), D90%–D10%, of the pigment contained in the ink composition, and the ink viscosity (mPa·s), η, at 20° C., by Expression (I) is within a range of 2500 to 4500, and the number of coarse particles having a pigment particle size not smaller than 0.5 μm contained in the ink composition is $7.0 \times 10^9$ or less per 1 mL of the ink composition.

The ink composition according to an aspect of the invention is a black ink composition containing a pigment and a resin emulsion, wherein the value, X, calculated, from the average particle diameter (nm), D50%, of the pigment contained in the ink composition, the particle size distribution width (nm), D90%–D10%, of the pigment contained in the ink composition, and the ink viscosity (mPa·s), η, at 20° C., by Expression (I) is within a range of 2500 to 4500, and the number of coarse particles having a pigment particle size not smaller than 0.5 μm contained in the ink composition is $7.0 \times 10^9$ or less per 1 mL of the ink composition. The black ink composition and so on according to aspects of the invention will be described below.

Black Ink Composition

In the black ink composition according to an aspect of the invention, the value X represented by Expression (I) is within a range of 2500 to 4500, and the number of coarse particles having a pigment particle size not smaller than 0.5 μm contained in the ink composition is $7.0 \times 10^9$ or less per 1 mL of the ink composition. Within these ranges, the ink composition can have satisfactory ink storage stability and can give an image realized with good balance between color development on plain paper, in particular, in high-speed printing and inhibition of a time-dependent change in printing density due to pigment sedimentation. In the invention, the term "plain paper" refers to paper that is not particularly considered for ink jet recording properties, such as a PPC sheet.

According to a preferred aspect of the invention, in the black ink composition of the invention, the ink viscosity (η) is 7.0 mPa·s or more; the value X represented by Expression (I) is within the range of 2500 to 4500; and the number of coarse particles having a pigment particle size not smaller than 0.5 μm contained in the ink composition is $7.0 \times 10^9$ or less per 1 mL of the ink composition. The value η is more preferably 8.0 mPa·s or more from the viewpoint of the ink viscosity. Within these ranges, an image in which color development on plain paper, in particular, in high-speed printing is further improved can be realized.

According to another preferred aspect of the invention, in the black ink composition of the invention, the average particle diameter (D50%) is 150 nm or more; the value X represented by Expression (I) is within the range of 2500 to 4500; and the number of coarse particles having a pigment particle size not smaller than 0.5 μm contained in the ink composition is $7.0 \times 10^9$ or less per 1 mL of the ink composition. The value D50% is more preferably 160 nm or more from the viewpoint of the average particle diameter. Within these ranges, an image in which color development on plain paper, in particular, in high-speed printing is further improved can be realized.

According to another preferred aspect of the invention, in the black ink composition of the invention, the particle size distribution width (D90%–D10%) is 230 nm or less; the value X represented by Expression (I) is within the range of 2500 to 4500; and the number of coarse particles having a pigment particle size not smaller than 0.5 μm contained in the ink composition is $7.0 \times 10^9$ or less per 1 mL of the ink composition. Within these ranges, an image in which a time-dependent change in printing density due to pigment sedimentation is further inhibited can be realized.

According to a more preferred aspect of the invention, in the black ink composition of the invention, the ink viscosity (η) is 7.0 mPa·s or more; the particle size distribution width (D90%–D10%) is 230 nm or less; the value X represented by Expression (I) is within the range of 2500 to 4500; and the number of coarse particles having a pigment particle size not smaller than 0.5 μm contained in the ink composition is $7.0 \times 10^9$ or less per 1 mL of the ink composition. The value η is more preferably 8.0 mPa·s or more from the viewpoint of the ink viscosity. Within these ranges, the black ink composition can have satisfactory ink storage stability and can give an image realized with better balance between color development on plain paper, in particular, in high-speed printing and inhibition of a time-dependent change in printing density due to pigment sedimentation.

According to another more preferred aspect of the invention, in the black ink composition of the invention, the value X represented by Expression (I) is within the range of 3200 to 4000; and the number of coarse particles having a pigment particle size not smaller than 0.5 μm contained in the ink composition is $2.0 \times 10^9$ or less per 1 mL of the ink composition. Within these ranges, the black ink composition can have satisfactory ink storage stability and can give an image realized with better balance between color development on plain paper, in particular, in high-speed printing and inhibition of a time-dependent change in printing density due to pigment sedimentation.

According to another more preferred aspect of the invention, in the black ink composition of the invention, the ink viscosity (η) is 7.0 mPa·s or more; the value X represented by Expression (I) is within the range of 3200 to 4000; and the number of coarse particles having a pigment particle size not smaller than 0.5 μm contained in the ink composition is $2.0 \times 10^9$ or less per 1 mL of the ink composition. The value η is more preferably 8.0 mPa·s or more from the viewpoint of the ink viscosity. Within these ranges, the black ink composition can have satisfactory ink storage stability and can give an image realized with better balance between color development on plain paper, in particular, in high-speed printing and inhibition of a time-dependent change in printing density due to pigment sedimentation.

According to another more preferred aspect of the invention, in the black ink composition of the invention, the ink viscosity (η) is 7.0 mPa·s or more; the particle size distribution width (D90%−D10%) is 230 nm or less; the value X represented by Expression (I) is within the range of 3200 to 4000; and the number of coarse particles having a pigment particle size not smaller than 0.5 μm contained in the ink composition is $2.0 \times 10^9$ or less per 1 mL of the ink composition. The value η is more preferably 8.0 mPa·s or more from the viewpoint of the ink viscosity. Within these ranges, the black ink composition can have satisfactory ink storage stability and can give an image realized with better balance between color development on plain paper, in particular, in high-speed printing and inhibition of a time-dependent change in printing density due to pigment sedimentation.

In the specification, the average particle diameter D50% is volume-average particle diameter, which can be measured by a dynamic light scattering method, and can be measured using, for example, Microtrac UPA 150 (Microtrac Inc.).

The D90% and D10% used in referring to the particle size distribution width D90%−D10% of the pigment contained in an ink composition can be measured with, for example, Microtrac UPA 150 (a product of Microtrac Inc.) employing the dynamic light scattering method, as in the average particle diameter D50%. The D90% and D10% are particle diameters at the points of 90% and 10%, respectively, in a cumulative curve determined from the resulting particle size distribution, when the total volume of the pigment particles is assumed as 100%.

The number of coarse particles having a pigment particle size not smaller than 0.5 μm contained in an ink composition can be measured using, for example, a particle counting-type particle size distribution analyzer, Accusizer 780 (a product of Particle Sizing Systems, Inc.).

The ink viscosity can be measured using a known viscometer, such as a B-type viscometer, an E-type viscometer, or a vibration-type viscometer.

The pigment in the black ink composition according to an aspect of the invention is preferably a self-dispersing pigment having a hydrophilic group on its surface.

The self-dispersing pigment is a pigment that is dispersible and/or soluble in an aqueous solvent without any dispersant. In the specification, the phrase "dispersible and/or soluble in an aqueous solvent without any dispersant" refers to a state in that a pigment can be stably present in an aqueous solvent due to a hydrophilic group on its surface even if any dispersant is not used for dispersing the pigment.

Ink containing the self-dispersing pigment as a colorant does not need any dispersant that is used for dispersing ordinary pigments. Therefore, since foaming due to a decrease in an antifoam property, which is caused by a dispersant, hardly occurs, ink having excellent discharge stability can be readily prepared. Furthermore, since a great increase in viscosity due to a dispersant is avoided, for example, the ink can contain a large amount of the pigment, which allows a sufficient increase of the printing density. Thus, handling of the ink is easy.

The black ink composition according to an aspect of the invention preferably contains a self-dispersing pigment having a hydrophilic group on its surface, wherein the hydrophilic group is at least one selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ (in the formulae, M denotes a hydrogen atom, an alkali metal, ammonium, or an organic ammonium; and R denotes an alkyl group having 1 to 12 carbon atoms, a phenyl group optionally having a substituent, or a naphthyl group optionally having a substituent).

The self-dispersing pigment of the black ink composition is produced by, for example, subjecting a pigment to physical treatment or chemical treatment to bind (graft) a hydrophilic group to the surface of the pigment. Examples of the physical treatment include vacuum plasma treatment. Examples of the chemical treatment include wet oxidation, which is oxidation with an oxidizing agent in water, and a method for binding a carboxyl group to the surface of a pigment via a phenyl group by binding, for example, p-aminobenzoic acid to the surface. Among these methods, the hydrophilic group is preferably grafted on the surface of a pigment by oxidation of the pigment.

In an aspect of the invention, the self-dispersing pigment of the black ink composition preferably has a surface subjected to oxidation with hypohalous acid and/or hypohalite, oxidation with ozone, or oxidation with persulfuric acid and/or persulfate, from the viewpoint of high color development. The dispersion of the black pigment having a surface subjected to treatment as described above may be subjected, according to need, to concentration with a separation membrane, filtration using a metal filter, a membrane filter, or the like, sorting by centrifugation, and neutralization with a hydroxide of an alkali metal salt or an amine.

The pigment used as a raw material for the self-dispersing pigment of the black ink composition may be carbon black produced by a known method, such as a contact method, a furnace method, or a thermal method. Specifically preferred examples of the carbon black in an aspect of the invention include No. 2300, 900, MCF88, No. 20B, No. 33, No. 40, No. 45, No. 52, MA7, MA8, MA100, and No. 2200B (products of Mitsubishi Chemical Corp.), Color Black FW1, FW2, FW2V, FW18, FW200, S150, S160, and S170, Printex 35, U, V, and 140U, Special Black 6, 5, 4A, 4, and 250 (products of Degussa Corp.), Conductex SC, Raven 1255, 5750, 5250, 5000, 3500, 1255, and 700 (products of Columbian Chemicals Co.), Regal 400R, 330R, and 660R, Mogul L, Monarch 700, 800, 880, 900, 1000, 1100, 1300, and 1400, and Elftex 12 (products of Cabot Corp.). These carbon blacks may be used alone or as a mixture of two or more thereof.

The self-dispersing pigment contained in the black ink composition according to an aspect of the invention may be a commercially available one, and a preferred example thereof is Microget CW1 (a product of Orient Chemical Industries Co., Ltd.).

The pigment content in the black ink composition according to an aspect of the invention is preferably 6% by mass or more. A pigment content not less than 6% by mass in the black ink composition can give recorded matters with high color development.

The self-dispersing pigment preferably has an average particle diameter in the range of 50 to 250 nm from the viewpoints of ink storage stability and prevention of clogging of nozzles.

The black ink composition according to an aspect of the invention preferably contains 10 to 60% by mass of water based on the amount of the ink composition, a water-soluble organic solvent, and a surfactant.

By regulating the content of water in the black ink composition to the above-mentioned range, the amount of water absorbed by cellulose in coated paper becomes smaller than those in known ink compositions. This can inhibit cellulose from swelling being thought to cause cockling or curling. Therefore, the ink composition according to this embodiment is also useful for plain paper and recording media having absorption layers as paper supports poor in ink absorbing property, such as coated paper for printing (printing paper).

Water contained in the black ink composition according to an aspect of the invention is a main solvent and is preferably pure or ultrapure water, such as ion-exchange water, ultrafiltered water, reverse osmosis water, or distilled water. In particular, water subjected to sterilization with, for example, ultraviolet irradiation or addition of hydrogen peroxide is preferred from the viewpoint of enabling long-period storage of ink compositions by preventing occurrence of mold and bacteria.

Examples of the water-soluble organic solvent in the invention include polyols, such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides, such as glucose, mannose, fructose, ribose, xylose, arabinose, galactose, aldonic acid, glucitol, (sorbit), maltose, cellobiose, lactose, sucrose, trehalose, and maltotriose; so-called solid wetting agents, such as sugar alcohols, hyaluronans, and ureas; alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; and 2-pyrrolidone, N-methyl-2-pyrrolidone, 1,3-dimethyl-2-imidazolidinone, formamide, acetamide, dimethyl sulfoxide, sorbit, sorbitane, acetin, diacetin, triacetin, and sulfolane. These may be used alone or in combination. The content of these water-soluble organic solvents is preferably 10 to 90% by mass based on the amount of the black ink composition from the viewpoints of ensuring appropriate physical properties (e.g., viscosity) and ensuring printing quality and reliability of the black ink composition. By adding such a water-soluble organic solvent to the black ink composition according to an aspect of the invention, even if the solid content is high, satisfactory storage stability and discharge stability can be achieved.

Furthermore, in an aspect of the invention, at least a polyol, a butyl ether of glycol, and a pyrrolidone are preferably used as the water-soluble organic solvent. By doing so, a black ink composition excellent in reliability, such as printing quality, discharge stability, and a clogging recovery property, can be provided. This is caused by that the polyol is suitable for retaining water (moisture-retaining property) and for controlling permeation of the black ink composition into a recording medium, such as plain paper; by that the butyl ether of glycol is suitable for discharge stability and for controlling permeation of the ink composition into a recording medium; and by that the pyrrolidone highly contributes to discharge stability and to storage stability and color development of the ink composition. Therefore, a black ink composition of which reliability, such as printing quality, discharge stability, and a clogging recovery property, is further enhanced can be provided by containing a polyol, a butyl ether of glycol, and a pyrrolidone.

Furthermore, in an aspect of the invention, the water-soluble organic solvent is preferably composed of 5% by mass or more of a polyol monoalkyl ether and/or a nitrogen-containing cyclic compound and a polyol. By containing such a water-soluble organic solvent, cockling and curling can be inhibited, and a satisfactory printing quality in respect of bleeding, unevenness, etc. can be ensured.

In this specification, examples of the polyol monoalkyl ether include diethylene glycol monoethyl ether, diethylene glycol monobutyl ether, diethylene glycol monoisobutyl ether, dipropylene glycol monomethyl ether, dipropylene glycol monoisopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether, among the above-mentioned glycol ethers. Examples of the nitrogen-containing cyclic compound include 1,3-dimethyl-2-imidazolidinone, 2-pyrrolidone, N-methyl-2-pyrrolidone, and ε-caprolactam.

The polyol may be any of the above-mentioned polyols, and particularly preferred are 1,2-alkanediols, such as 1,2-pentanediol, 1,2-hexanediol, and 1,2-octanediol.

The surfactant contained in the black ink composition according to an aspect of the invention may be an anionic surfactant, a cationic surfactant, an ampholytic surfactant, or a nonionic surfactant, and a nonionic surfactant is particularly preferred from the viewpoint of providing an ink composition low in foaming.

Specific examples of the nonionic surfactant include acetylene glycol surfactants; acetylene alcohol surfactants; ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester surfactants, such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; polyether modified siloxane surfactants, such as dimethylpolysiloxane; and fluorine-containing surfactants, such as fluoroalkyl esters and perfluoroalkyl carboxylate. The nonionic surfactants may be used alone or in combination.

According to a preferred aspect of the invention, an ink composition containing the acetylene glycol surfactant and/or the polyether modified siloxane surfactant, among the above-mentioned nonionic surfactants, is low in foaming and has an excellent antifoam property and is therefore particularly preferred.

Specific examples of the acetylene glycol surfactant include 2,4,7,9-tetramethyl-5-decine-4,7-diol, 3,6-dimethyl-4-octin-3,6-diol, and 3,5-dimethyl-1-pexin-3-ol, and commercially available examples of the acetylene glycol surfactant include Surfynol 104, 82, 465, 485, and TG (products of Air Products and Chemicals Inc.) and Olfine STG and Olfine E1010 (products of Nissin Chemical Industry Co., Ltd.). Specific examples of the polyether modified siloxane surfactant include BYK-345, BYK-346, BYK-347, BYK-348, and UV3530 (products of BYK-Chemie GmbH). The ink composition may contain a plurality of these surfactants. The surface tension is preferably adjusted to 20 to 40 mN/m, and the surfactant content in the ink composition is preferably 0.1 to 3.0% by mass.

The black ink composition according to an aspect of the invention preferably contains a pH adjuster. As the pH adjuster, for example, alkali hydroxide, such as lithium hydroxide, potassium hydroxide, or sodium hydroxide, and/or ammonium oxide, or alkanol amine, such as triethanolamine, tripropanolamine, diethanolamine, or monoethanol amine, can be used. In particular, the ink composition preferably contains a pH adjuster that is at least one selected from the group consisting of hydroxides of alkali metals, ammonia, triethanolamine, and tripropanolamine to adjust the pH to 6 to 10. A pH value outside this range will disadvantageously affect materials constituting an ink jet printer and deteriorates the clogging recovery property.

Furthermore, as a pH buffer, collidine, imidazole, phosphoric acid, 3-(N-morpholino)propanesulfonic acid, tris(hydroxymethyl)aminomethane, or boric acid can be used according to need.

The black ink composition according to an aspect of the invention may further contain, for example, an antifoam agent, an antioxidant, an ultraviolet absorber, or an antiseptic/anti-fungal agent, according to need.

Examples of the antioxidant and the ultraviolet absorber include allophanates, such as allophanate and methyl allophanate; biurets, such as biuret, dimethyl biuret, and tetramethyl biuret; L-ascorbic acid and its salts; Tinuvin 328, 900, 1130, 384, 292, 123, 144, 622, 770, and 292, Irgacor 252 and 153, Irganox 1010, 1076, 1035, and MD 1024 (products of Chiba Specialty Chemicals Inc.); and oxides of lanthanide.

Examples of the antiseptic/anti-fungal agents include sodium benzoate, sodium pentachlorophenol, sodium 2-pyridinethiol-1-oxide, sodium sorbate, sodium dehydroacetate, and 1,2-dibenzine thiazolin-3-one (Proxel CRL, Proxel BND, Proxel GXL, Proxel XL-2, and Proxel TN, available from ICI Co., Ltd.).

Resin Emulsion

The resin emulsion has an effect of improving the fixing property of the image portion of a recorded matter by fixing a colorant on a recording medium by means of fusion between the resin particles and between the resin particles and the colorant when the ink is dried.

The resin particles are preferably one or more kinds of particles selected from the group consisting of acrylic resins, methacrylic resins, styrene resins, urethane resins, acrylamide resins, and epoxy resins. These resins may be used as homopolymers or copolymers.

In an aspect of the invention, the resin particles may have a single-particle structure. In another aspect of the invention, resin particles may have a core/shell structure that is composed of a core portion and a shell portion surrounding the core portion. In the invention, the term "core/shell structure" refers to "a configuration in which two or more kinds of polymers having different compositions exist in a phase-separated form in a particle". Therefore, it includes not only a configuration in which the shell portion completely covers the core portion but also a configuration in which the shell portion partially covers the core portion. In addition, a configuration in which a part of the polymer of the shell portion forms, for example, a domain in the core portion is included. Furthermore, a multilayer structure composed of three or more layers in which one or more layers having compositions different from those of the core portion and the shell portion are disposed between the core portion and the shell portion is also included.

The resin particles used in an aspect of the invention can be prepared by a known emulsion polymerization. That is, the resin particles can be prepared by emulsion-polymerizing an unsaturated vinyl monomer in water in the presence of a polymerization catalyst and an emulsifier.

Examples of the unsaturated vinyl monomer include monomers, which are usually used in emulsion polymerization, such as acrylate monomers, methacrylate monomers, aromatic vinyl monomers, vinyl ester monomers, vinyl cyan compound monomers, halogenated monomers, olefin monomers, and diene monomers.

Specific examples of the unsaturated vinyl monomer include acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyan compounds, such as acrylonitrile and methacrylonitrile; halogenated monomers, such as vinylidene chloride and vinyl chloride; aromatic vinyl monomers, such as styrene, α-methylstyrene, vinyltoluene, t-butylstyrene, chlorostyrene, vinylanisole, and vinylnaphthalene; olefins, such as ethylene and propylene; dienes, such as butadiene and chloroprene; vinyl monomers, such as vinyl ether, vinyl ketone, and vinyl pyrrolidone; unsaturated carboxylic acids, such as acrylic acid, methacrylic acid, itaconic acid, fumaric acid, and maleic acid; acrylamides, such as acrylamide and N,N'-dimethylacrylamide; and hydroxyl group-containing monomers, such as 2-hydroxyethyl acrylate, 2-hydroxypropyl acrylate, 2-hydroxyethyl methacrylate, and 2-hydroxypropyl methacrylate.

In an aspect of the invention, the molecules derived from the above-mentioned monomers may have a cross-linked structure by a cross-linkable monomer having two or more polymerizable double bonds. Examples of the cross-linkable monomer having two or more polymerizable double bonds include diacrylate compounds, such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; and methylenebisacrylamide, and divinylbenzene. These can be used alone or in combination.

The polymerization initiator, emulsifier, and molecular-weight adjuster used in the emulsion polymerization may be those used in common methods.

The polymerization initiator may be one used in usual radical polymerization, and examples thereof include potassium persulfate, ammonium persulfate, hydrogen peroxide, azobisisobutylonitrile, benzoyl peroxide, dibutyl peroxide, peracetic acid, cumene hydroperoxide, t-butyl hydroxyperoxide, and para menthane hydroxyperoxide. In particular, when the polymerization reaction is performed in water as described above, a water-soluble polymerization initiator is preferred.

Examples of the emulsifier include, in addition to sodium lauryl sulfate, those usually used as anionic surfactants, nonionic surfactants, and ampholytic surfactants. These can be used alone or in combination.

When the resin particles are produced by emulsion polymerization, in particular, when a polymer emulsion constituted of anionic resin particles is produced by emulsion polymerization, since a negative polar group, such as a carboxyl group or sulfonic acid group, exists on the surfaces of the resin particles, the pH shifts toward the acidic side to readily cause an increase in viscosity and aggregation. Therefore, usually, neutralization with a basic material is performed. As the basic material, for example, ammonia, an organic amine, or an inorganic hydroxide can be used. From the viewpoints of long period storage stability of the polymer emulsion and the aqueous ink composition and discharge stability, monovalent inorganic hydroxides (potassium hydroxide, sodium hydroxide, and lithium hydroxide) are particularly preferred. The amount of the neutralizing agent is appropriately determined so that the pH of the polymer emulsion is in the range of 7.5 to 9.5 and preferably in the range of 7.5 to 8.5.

The particle diameter of the resin particles used in an aspect of the invention is preferably in the range of 5 to 400 nm, more preferably in the range of 50 to 200 nm, from the viewpoints of long period storage stability and discharge stability of the ink composition.

The amount of the resin emulsion may be appropriately determined in view of, for example, the fixing property, but is preferably 2% by mass or more as a solid content in the black ink composition according to an aspect of the invention.

Ink Set

The black ink composition according to an aspect of the invention can be also used in combination with a color ink composition and/or another black ink composition (hereinafter, the black ink composition other than the above-described black ink composition is referred to as "the other black ink composition") as an ink set. The color ink composition and/or the other black ink composition may contain a self-dispersing pigment and/or a pigment dispersible in water through a resin.

Examples of the pigment contained in the color ink composition include phthalocyanine-based, azo-based, anthraquinone-based, azomethine-based, and condensed ring-based pigments, in addition to pigments listed in the Color Index, such as pigment yellows, pigment reds, pigment violets, and pigment blues, and also include organic pigment, such as Yellow Nos. 4, 5, 205, and 401, Orange Nos. 228 and 405, and Blue Nos. 1 and 404; and inorganic pigment, such as titanium oxide, zinc oxide, zirconium oxide, iron oxide, ultramarine, iron blue, and chromium oxide. Specific examples include C.I. pigment yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198, C.I. pigment red 1, 3, 5, 8, 9, 16, 17, 19, 22, 38, 57:1, 90, 112, 122, 123, 127, 146, and 184, C.I. pigment violet 1, 3, 5:1, 16, 19, 23, and 38, and C.I. pigment blue 1, 2, 15, 15:1, 15:2, 15:3, 15:4, and 16. Preferably, the organic pigment contained in the yellow ink composition contains at least one selected from the group consisting of C.I. pigment yellow 74, 109, 110, 128, 138, 147, 150, 155, 180, and 188; the organic pigment contained in the magenta ink composition contains at least one selected from the group consisting of C.I. pigment red 122, 202, 207, and 209 and C.I. pigment violet 19; and the organic pigment contained in the cyan ink composition contains at least one selected from the group consisting of C.I. pigment blue 15, 15:1, 15:2, 15:3, 15:4, and 16.

When the color ink composition and/or the other black ink composition contains a self-dispersing pigment, the self-dispersing pigment is produced by, for example, subjecting a pigment to physical treatment or chemical treatment to bind (graft) the above-mentioned hydrophilic group to the surface of the pigment. Examples of the physical treatment include vacuum plasma treatment. Examples of the chemical treatment include wet oxidation, which is oxidation with an oxidizing agent in water, and a method for binding a carboxyl group to the surface of a pigment via a phenyl group by binding, for example, p-aminobenzoic acid to the surface.

The self-dispersing pigment of the color ink composition may be commercially available one, such as CAB-O-JET 250C, CAB-O-JET 260M, and CAB-O-JET 270Y (products of Cabot Corp.).

The amount of the pigment in the color ink composition and/or the other black ink composition is preferably 6% by mass or more, as in that of the black ink composition. When the pigment concentration is 6% by mass or more, a recorded matter with high color development can be provided.

The pigment in the color ink composition and/or the other black ink composition preferably has an average particle diameter in the range of 50 to 250 nm from the viewpoints of ink storage stability and prevention of clogging of nozzles, as in the black ink composition.

The pigment in the color ink composition and/or the other black ink composition preferably contains at least 10 to 60% by mass of water, a water-soluble organic solvent, and a surfactant, as in the black ink composition. Specific examples thereof and their amounts may be the same as those in the black ink composition.

The color ink composition and/or the other black ink composition may further contain, for example, a pH adjuster, a pH buffer, an antifoam agent, an antioxidant, an ultraviolet absorber, an antiseptic/anti-fungal agent, and a resin emulsion, according to need, as in the black ink composition. Specific examples thereof may be the same as those in black ink composition.

The ink set according to an aspect of the invention can be constituted as in known ink sets and can be used as ink for known various types of recording methods. In particular, in an aspect of the invention, the ink set is suitable for ink jet recording, that is, for recording performed by letting ink droplets fly and adhere to a recording medium, such as paper, because a high-resolution and high-quality image can be printed at a high speed using a relatively inexpensive apparatus.

Ink Jet Recording Method

An ink jet recording method using the black ink composition according to an aspect of the invention or the ink set including the black ink composition according to an aspect of the invention performs printing by discharging droplets of the ink composition and letting the droplets adhere to a heated recording medium. The droplets of each ink composition are discharged to record characters and symbols on a recoding medium, for example, by converting electric signals to mechanical signals using an electrostrictive element to intermittently discharge ink stored in a nozzle head portion or by rapidly heating ink stored in a nozzle head portion at a place significantly near the discharging portion to form foams and intermittently discharging the ink by means of volume expansion due to the foams. According to a preferred aspect of the invention, the black ink composition of the invention or the ink set including the black ink composition of the invention is preferably used in an ink jet recording method using electrostrictive element. In the black ink composition according to an aspect of the invention or the ink set including the black ink composition according to an aspect of the invention, droplets of the ink are preferably discharged from a recording head by the mechanical action of a piezoelectric element.

In the recorded matter obtained by performing recording on a recording medium using the black ink composition according to an aspect of the invention or the ink set including the black ink composition according to an aspect of the invention, an image is realized with satisfactory ink storage stability and good balance between color development on plain paper, in particular, in high-speed printing and inhibition of a time-dependent change in printing density due to pigment sedimentation.

As the recording medium, various kinds of recording media can be used, and examples thereof include exclusive paper for in jet printing (e.g., matte paper and gloss paper), plain paper, printing paper, and films.

EXAMPLE A

The invention will be described in more detail with the following examples, but is not limited to these examples.

Preparation of Black Pigment Dispersion 1

MA 600 (500 g, a product of Mitsubishi Chemical Corp.), which is commercially available carbon black, was added to ion exchange water (3750 g), and the mixture was heated to 50° C. while stirring with a dissolver. Then, an aqueous solution (5300 g) of sodium hypochlorite (available chlorine concentration: 12%) was dropwise added to the mixture over a period of 3.5 hours at 50 to 60° C. while performing pulverization with a sand mill using zirconium beads having a diameter of 0.8 mm. The pulverization was further conducted for another 30 minutes with the sand mill to obtain a reaction solution containing modified carbon black. This reaction solution was filtered through a 400-mesh metal net to remove the zirconium beads and unreacted carbon black. An aqueous solution of 5% potassium hydroxide was added to the resulting reaction solution to adjust the pH to 7.5. The solution was demineralized and purified with an ultrafiltration membrane until the solution has an electrical conductivity of 1.5 mS/cm and, subsequently, was further demineralized and purified with an electrodialyzer until the solution had an electrical conductivity of 1.0 mS/cm. The resulting solution was concentrated to obtain a carbon black concentration of 22% by mass. This concentrated solution was subjected to continuous centrifugation at a centrifugal force of 15000 G and a flow rate of 200 mL/min and then to three-stage filtration with filters of 1 μm, 0.6 μm, and 0.3 μm. The resulting filtrate was diluted with ion exchange water to obtain a dispersion having a carbon black solid content of 20% by mass as black pigment dispersion 1.

Preparation of Black Pigment Dispersion 2

Black pigment dispersion 2 having a carbon black solid content of 20% by mass was prepared as in the black pigment dispersion 1 except that MA 8 (a product of Mitsubishi Chemical Corp.), which is commercially available carbon black, was used as the pigment instead of MA 600.

Preparation of Black Pigment Dispersion 3

Black pigment dispersion 3 having a carbon black solid content of 20% by mass was prepared as in the black pigment dispersion 1 except that the filtration was performed with two-stage filtration with filters of 1 μm and 0.6 μm.

Preparation of Black Pigment Dispersion 4

Black pigment dispersion 4 having a carbon black solid content of 20% by mass was prepared as in the black pigment dispersion 1 except that Color Black 5170 (a product of Degussa-Huls AG), which is commercially available carbon black, was used as the pigment instead of MA 600.

Preparation of Black Pigment Dispersion 5

Black pigment dispersion 5 having a carbon black solid content of 20% by mass was prepared as in the black pigment dispersion 1 except that the filtration was performed with one-stage filtration with a filter of 1 μm.

Preparation of Black Pigment Dispersion 6

Black pigment dispersion 6 having a carbon black solid content of 20% by mass was prepared as in the black pigment dispersion 1 except that #44 (a product of Mitsubishi Chemical Corp.), which is commercially available carbon black, was used as the pigment instead of MA 600.

Preparation of Black Pigment Dispersion 7

Black pigment dispersion 7 having a carbon black solid content of 20% by mass was prepared as in the black pigment dispersion 1 except that the filtration was performed at a centrifugal force of 10000 G and a flow rate of 200 mL/min.

Preparation 1 of Each Ink Composition

The components of each composition shown in the following Table 1 were mixed, and each mixture was filtered through a membrane filter of 10 μm to prepare each ink composition. Note that the numerical values in Table 1 show contents (% by mass) in ink. The viscosity of each ink composition shown in Table 1 is the value obtained by measuring the resulting ink composition with a vibration viscometer, VM-100 (a product of Yamaichi Electric Co., Ltd.), at 20° C. The average particle diameter (D50%) and particle size distribution width (nm) (D90%–D10%) were calculated from the particle size distribution measured by Microtrac UPA 150 (a product of Microtrac Inc.). The numbers of coarse particles having a particle size not smaller than 0.5 μm shown in Table 1 are values obtained by measurement with Accusizer 780 (a product of Particle Sizing Systems, Inc.).

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Black pigment dispersion 1 (solid content: 20%) | 35 | 35 |  |  |  |  |  |  | 35 |
| Black pigment dispersion 2 (solid content: 20%) |  |  | 35 |  |  |  |  |  |  |

TABLE 1-continued

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Black pigment dispersion 3 (solid content: 20%) | | | | 35 | | | | | |
| Black pigment dispersion 4 (solid content: 20%) | | | | | 30 | | | | |
| Black pigment dispersion 5 (solid content: 20%) | | | | | | | | 35 | |
| Black pigment dispersion 6 (solid content: 20%) | | | | | | | | | 35 |
| Black pigment dispersion 7 (solid content: 20%) | | | | | | 35 | | | |
| Glycerin | 8 | 8 | 10 | 8 | 8 | 8 | 8 | 8 | 10 |
| Triethylene glycol | 5 | 5 | 5 | 5 | 5 | 5 | 5 | 5 | 5 |
| 1,2-Hexanediol | 5 | 5 | 5 | 5 | 5 | 5 | 5 | 5 | 5 |
| Trimethylolpropane | 3 | 3 | 3 | 3 | 3 | 3 | 3 | 3 | 3 |
| Triethylene glycol monobutyl ether | 20 | 14 | 20 | 20 | 11 | 20 | 20 | 12 | 20 |
| Olfine E1010 | 0.5 | 0.5 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 | 0.5 | 0.5 |
| Triethanolamine | 1 | 1 | 1 | 1 | 1 | 1 | 1 | 1 | 1 |
| Water | balance | balance | balance | balance | balance | balance | balance | balance | balance |
| Total amount | 100 | 100 | 100 | 100 | 100 | 100 | 100 | 100 | 100 |
| Pigment in ink composition | 7 | 7 | 7 | 7 | 6 | 7 | 7 | 7 | 7 |
| Water in ink composition | 50 | 56 | 48 | 50 | 60 | 50 | 50 | 58 | 48 |
| $\eta$ [mPa·s] | 10.0 | 7.4 | 10.1 | 10.0 | 3.7 | 10.0 | 9.9 | 6.7 | 10.0 |
| D50% [nm] | 169 | 168 | 151 | 169 | 102 | 169 | 168 | 170 | 145 |
| D90% − D10% [nm] | 197 | 198 | 169 | 199 | 111 | 242 | 200 | 198 | 161 |
| {(D50%) × (D90% − D10%)}/$\eta$ | 3329 | 4495 | 2527 | 3363 | 3060 | 4090 | 3394 | 5024 | 2335 |
| No. of coarse particles of not less than 0.5 μm (particles/mL) | $7.7 \times 10^8$ | $1.8 \times 10^9$ | $1.5 \times 10^9$ | $6.5 \times 10^9$ | $5.3 \times 10^7$ | $1.3 \times 10^9$ | $2.2 \times 10^{10}$ | $9.8 \times 10^8$ | $1.5 \times 10^8$ |

Evaluation Method

Evaluation of Color Development on Plain Paper

100% solid printing by each of the prepared black ink compositions was performed using an ink jet printer, PX-A550 (a product of Seiko Epson Corp.), filled with the black ink composition on a recording medium, Xerox 4024 or Xerox P (products of Fuji Xerox Co., Ltd.). The resulting samples were left to stand under an ordinary environment for one hour. After the leaving, the optical density (OD) of the solid printed area of each sample was measured with a Gretag densitometer (a product of GretagMacbeth). Average OD values were evaluated based on the following criteria:

A: OD value not less than 1.40,
B: OD value not less than 1.30 and less than 1.40,
C: OD value not less than 1.20 and less than 1.30, and
D: OD value less than 1.20.

The results are shown in Table 2.

Evaluation of Time-Dependent Change in OD

Each ink cartridge filled with each black ink composition prepared above was centrifuged under the following conditions:

Turning radius: 20 cm,
Centrifugal acceleration: 600 rpm,
Centrifugation time: 15 hours,
Centrifugal direction: the same direction as that when the cartridge is installed on a printer.

The ink cartridge after the centrifugation was installed on an ink jet recording apparatus, PX-A550 (a product of Seiko Epson Corp.), without shaking, and 100% solid printing was continuously performed. Xerox P (a product of Fuji Xerox Co., Ltd.) was used as the recording medium, and the printing was continued until the ink in the cartridge was used up so that printing became completely impossible. After the printing, the recorded matters were left to stand under an ordinary environment for one hour. The OD of each page of the resulting recorded matters was measured with a Gretag densitometer (a product of GretagMacbeth), and the measured OD values were plotted on the vertical axis against number of printed pages on the horizontal axis to obtain a graph. From the graph, the page number showing the maximum OD value, the page number showing the minimum OD value, and the respective OD values were read and recorded. The resulting ΔOD value [(maximum OD value)−(minimum OD value)] refers to the maximum variation in OD values due to sedimentation occurring in one cartridge. The obtained ΔOD values were evaluated by the following criteria:

A: ΔOD value less than 0.08,
B: ΔOD value not less than 0.08 and less than 0.13,
C: ΔOD value not less than 0.13 and less than 0.18, and
D: ΔOD value not less than 0.18.

The results are shown in Table 2.

Evaluation of Ink Storage Stability

Each black ink composition (60 g) prepared above was placed in each 100 g plastic bottle. The bottles were sealed and were then left to stand under an environment of 70° C. for one week. The viscosity of each ink composition was measured before and after the leaving with a vibration viscometer (a product of Yamaichi Electric Co., Ltd.). From the change in viscosity, storage stability was evaluated based on the following criteria:

A: change in viscosity less than ±5%,
B: change in viscosity not less than ±5% and less than ±10%, and
C: change in viscosity not less than ±10%.

The results are shown in Table 2.

TABLE 2

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Color development on plain paper | A | A | B | A | C | A | A | A | D |
| Time-dependent change in OD | A | B | A | A | A | C | B | D | A |
| Ink storage stability | A | A | A | B | A | A | C | A | A |

EXAMPLE B

Preparation of Resin Emulsion

Ion exchange water (900 g) and sodium lauryl sulfate (1 g) were placed in a reaction vessel equipped with an agitator, a reflux condenser, a dropping device, and a thermometer and were heated to 70° C. while substituting with nitrogen under stirring. To the mixture, potassium persulfate (4 g), serving as a polymerization initiator, was added while maintaining the internal temperature at 70° C. To the reaction solution after dissolution, an emulsion separately prepared by adding acrylamide (20 g), styrene (365 g), butyl acrylate (545 g), and methacrylic acid (30 g) to ion exchange water (450 g) and sodium laury sulfate (3 g) under stirring was dropwise added continuously over a period of 4 hours, followed by maturing for 3 hours after the completion of the dropping. The resulting resin emulsion was cooled to room temperature, and ion exchange water and an aqueous solution of sodium hydroxide were added thereto to adjust the solid content to 40% by mass and the pH to 8. The glass transition temperature of the resin particles in the resulting aqueous emulsion was −6° C.

Preparation 2 of Each Ink Composition

The components of each composition shown in the following Table 3 were mixed, and each mixture was filtered through a membrane filter of 10 μm to prepare each ink composition. Note that the numerical values in Table 3 show contents (% by mass) in ink and that the black pigment dispersions 1 to 7 in Table 3 were the above-described black pigment dispersions 1 to 7. The viscosity of each ink composition shown in Table 3 is the value obtained by measuring the resulting ink composition with a vibration viscometer, VM-100 (a product of Yamaichi Electric Co., Ltd.), at 20° C. The average particle diameter (D50%) and particle size distribution width (nm) (D90%−D10%) were calculated from the particle size distribution measured by Microtrac UPA 150 (a product of Microtrac Inc.). The numbers of coarse particles having a particle size not smaller than 0.5 μm shown in Table 3 are values obtained by measurement with Accusizer 780 (a product of Particle Sizing Systems, Inc.).

TABLE 3

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Black pigment dispersion 1 (solid content: 20%) | 35 | 35 |  |  |  |  | 35 |  | 35 |  |
| Black pigment dispersion 2 (solid content: 20%) |  |  | 35 |  |  |  |  |  |  |  |
| Black pigment dispersion 3 (solid content: 20%) |  |  |  | 35 |  |  |  |  |  |  |
| Black pigment dispersion 4 (solid content: 20%) |  |  |  |  | 30 |  |  |  |  |  |
| Black pigment dispersion 5 (solid content: 20%) |  |  |  |  |  |  |  | 35 |  |  |
| Black pigment dispersion 6 (solid content: 20%) |  |  |  |  |  |  |  |  |  | 35 |
| Black pigment dispersion 7 (solid content: 20%) |  |  |  |  |  | 35 |  |  |  |  |
| Resin emulsion (resin solid content: 40%) | 7.5 | 7.5 | 7.5 | 7.5 | 5 | 7.5 | 7.5 | 7.5 | 7.5 | 7.5 |
| Glycerin | 8 | 8 | 10 | 8 | 8 | 8 | 8 | 8 | 8 | 10 |
| Triethylene glycol | 5 | 5 | 5 | 5 | 5 | 5 | 5 | 5 | 5 | 5 |
| 1,2-Hexanediol | 5 | 5 | 5 | 5 | 5 | 5 | 5 | 5 | 5 | 5 |
| Trimethylolpropane | 3 | 3 | 3 | 3 | 3 | 3 | 3 | 3 | 3 | 3 |
| Triethylene glycol monobutyl ether | 15 | 9 | 15 | 15 | 9 | 15 | 20 | 15 | 7 | 15 |

TABLE 3-continued

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Olfine E1010 | 0.5 | 0.5 | 0.5 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 | 0.5 | 0.5 | 0.5 |
| Triethanolamine | 1 | 1 | 1 | 1 | 1 | 1 | 1 | 1 | 1 | 1 |
| Water | balance | balance | balance | balance | balance | balance | balance | balance | balance | balance |
| Total amount | 100 | 100 | 100 | 100 | 100 | 100 | 100 | 100 | 100 | 100 |
| Pigment in ink composition | 7 | 7 | 7 | 7 | 6 | 7 | 7 | 7 | 7 | 7 |
| Water in ink composition | 52 | 58 | 50 | 52 | 60 | 52 | 52 | 52 | 50 | 50 |
| $\eta$ [mPa·s] | 10.2 | 7.5 | 10.1 | 10.2 | 4.0 | 10.1 | 10.0 | 10.2 | 6.6 | 9.9 |
| D50% [nm] | 170 | 168 | 150 | 171 | 102 | 169 | 169 | 169 | 171 | 144 |
| D90% − D10% [nm] | 202 | 200 | 171 | 205 | 115 | 244 | 197 | 206 | 198 | 163 |
| {(D50%) × (D90% − D10%)}/$\eta$ | 3367 | 4480 | 2539 | 3437 | 2933 | 4083 | 3329 | 3413 | 5130 | 2370 |
| No. of coarse particles of not less than 0.5 μm (particles/mL) | $1.0 \times 10^9$ | $1.1 \times 10^9$ | $1.4 \times 10^9$ | $6.8 \times 10^9$ | $6.7 \times 10^7$ | $1.4 \times 10^9$ | $7.7 \times 10^8$ | $1.6 \times 10^{10}$ | $8.7 \times 10^8$ | $1.3 \times 10^9$ |

Evaluation Method

Evaluation of Color Development on Plain Paper

100% solid printing by each black ink composition was performed using an ink jet printer, PX-A550 (a product of Seiko Epson Corp.), filled with the black ink composition on a recording medium, Xerox 4024 or Xerox P (products of Fuji Xerox Co., Ltd.). The resulting samples were left to stand under an ordinary environment for one hour. After the leaving, the optical density (OD) of the solid printed area of each sample was measured with a Gretag densitometer (a product of GretagMacbeth). Average OD values were evaluated based on the following criteria:

A: OD value not less than 1.40,
B: OD value not less than 1.30 and less than 1.40,
C: OD value not less than 1.20 and less than 1.30, and
D: OD value less than 1.20.

The results are shown in Table 4.

Evaluation of Time-Dependent Change in OD

Each ink cartridge filled with each black ink composition prepared above was centrifuged under the following conditions:

Turning radius: 20 cm,
Centrifugal acceleration: 600 rpm,
Centrifugation time: 15 hours,
Centrifugal direction: the same direction as that when the cartridge is installed on a printer.

The ink cartridge after the centrifugation was installed on an ink jet recording apparatus, PX-A550 (a product of Seiko Epson Corp.), without shaking, and 100% solid printing was continuously performed. Xerox P (a product of Fuji Xerox Co., Ltd.) was used as the recording medium, and the printing was continued until the ink in the cartridge was used up so that printing became completely impossible. After the printing, the recorded matters were left to stand under an ordinary environment for one hour. The OD of each page of the resulting recorded matters was measured with a Gretag densitometer (a product of GretagMacbeth), and the measured OD values were plotted on the vertical axis against number of printed pages on the horizontal axis to obtain a graph. From the graph, the page number showing the maximum OD value, the page number showing the minimum OD value, and the respective OD values were read and recorded. The resulting ΔOD value [(maximum OD value)−(minimum OD value)] refers to the maximum variation in OD values due to sedimentation occurring in one cartridge. The obtained ΔOD values were evaluated by the following criteria:

A: ΔOD value less than 0.08,
B: ΔOD value not less than 0.08 and less than 0.13,
C: ΔOD value not less than 0.13 and less than 0.18, and
D: ΔOD value not less than 0.18.

The results are shown in Table 4.

Evaluation of Ink Storage Stability

Each black ink composition (60 g) prepared above was placed in each 100 g plastic bottle. The bottles were sealed and were then left to stand under an environment of 70° C. for one week. The viscosity of each ink composition was measured before and after the leaving with a vibration viscometer (a product of Yamaichi Electric Co., Ltd.). From the change in viscosity, storage stability was evaluated based on the following criteria:

A: change in viscosity less than ±5%,
B: change in viscosity not less than ±5% and less than ±10%, and
C: change in viscosity not less than ±10%.

The results are shown in Table 4.

Evaluation of Fixing Property to Plain Paper

Printing of a pattern containing solid and characters was performed as in the evaluation of color development on plain paper. The resulting recorded matters were naturally dried for 24 hours. Then, the printed characters were traced at a pen pressure of 300 g/15 mm$^2$ with a yellow aqueous highlighter pen, Zebra Pen 2 (trademark, Zebra Co., Ltd.). The pen tip was visually observed whether it had contamination or not. The results were evaluated based on the following criteria:

A: no contamination occurred after tracing the same portion twice,
B: contamination did not occur after first tracing, but occurred after the second tracing, and
C: contamination occurred after tracing once.

TABLE 4

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Color development on plain paper | A | A | B | A | C | A | A | A | A | D |
| Time-dependent change in OD | A | B | A | A | A | C | A | B | D | A |
| Ink storage stability | A | A | A | B | A | A | A | C | A | A |
| Fixing property to plain paper | A | A | A | A | A | A | C | A | A | A |

What is claimed is:

1. A black ink composition comprising a pigment, wherein the value, X, calculated, from the average particle diameter (nm), D50%, of the pigment contained in the ink composition, the particle size distribution width (nm), D90%–D10%, of the pigment contained in the ink composition, and the ink viscosity (mPa·s), η at 20° C., by the following Expression (I):

$$X = \{D50\% \times (D90\% - D10\%)\}/\eta \quad (I)$$

is within a range of 2500 to 4500, and the number of coarse particles having a pigment particle size not smaller than 0.5 μm contained in the ink composition is $7.0 \times 10^9$ or less per 1 mL of the ink composition; wherein the particle size distribution width (D90%–D10%) is 230 nm or less, wherein the average diameter D50% is 160 nm or greater.

2. The ink composition according to claim 1, further comprising a resin emulsion.

3. The ink composition according to claim 2, wherein the amount of the resin emulsion is not less than 2% by mass of the ink composition.

4. The ink composition according to claim 1, wherein the amount of the pigment is not less than 6% by mass of the ink composition.

5. The ink composition according to claim 1, wherein the pigment is a self-dispersing pigment having a hydrophilic group on its surface.

6. The ink composition according to claim 5, wherein the hydrophilic group on the surface of the pigment is grafted by oxidation of the surface.

7. The ink composition according to claim 6, wherein the oxidation is performed by treatment with hypohalous acid and/or hypohalite, treatment with ozone, or treatment with persulfuric acid and/or persulfate.

8. The ink composition according to claim 5, wherein the hydrophilic group is at least one functional group selected from the group consisting of —OM, —COOM, —CO—, —SO3M, —SO2M, —SO2NH2, —RSO2M, —PO3HM, —PO3M2, —SO2NHCOR, —NH3, and —NR3 (in the formulae, M denotes a hydrogen atom, an alkali metal, ammonium, or an organic ammonium; and R denotes an alkyl group having 1 to 12 carbon atoms, a phenyl group optionally having a substituent, or a naphthyl group optionally having a substituent).

9. The ink composition according to claim 1, the ink composition comprising at least 10 to 60% by mass of water based on the amount of the ink composition, a water-soluble organic solvent, and a surfactant.

10. The ink composition according to claim 9, wherein the water-soluble organic solvent is composed of 5% by mass or more of a polyol monoalkyl ether and/or a nitrogen containing cyclic compound and a polyol.

11. The ink composition according to claim 9, wherein the surfactant is an acetylene glycol surfactant and/or a polyether modified siloxane surfactant.

12. An ink jet recording method for performing printing by discharging droplets of an ink composition and letting the droplets adhere to a recording medium, wherein the ink composition is the ink composition according to claim 1.

* * * * *